May 3, 1932.   A. D. JOHNSTON   1,857,051
MEANS FOR CONTROLLING THE LIQUID LEVEL IN CONTAINERS
Filed July 19, 1930   2 Sheets-Sheet 1

WITNESS

INVENTOR
A. D. Johnston,
BY
ATTORNEY

May 3, 1932.   A. D. JOHNSTON   1,857,051
MEANS FOR CONTROLLING THE LIQUID LEVEL IN CONTAINERS
Filed July 19, 1930   2 Sheets-Sheet 2
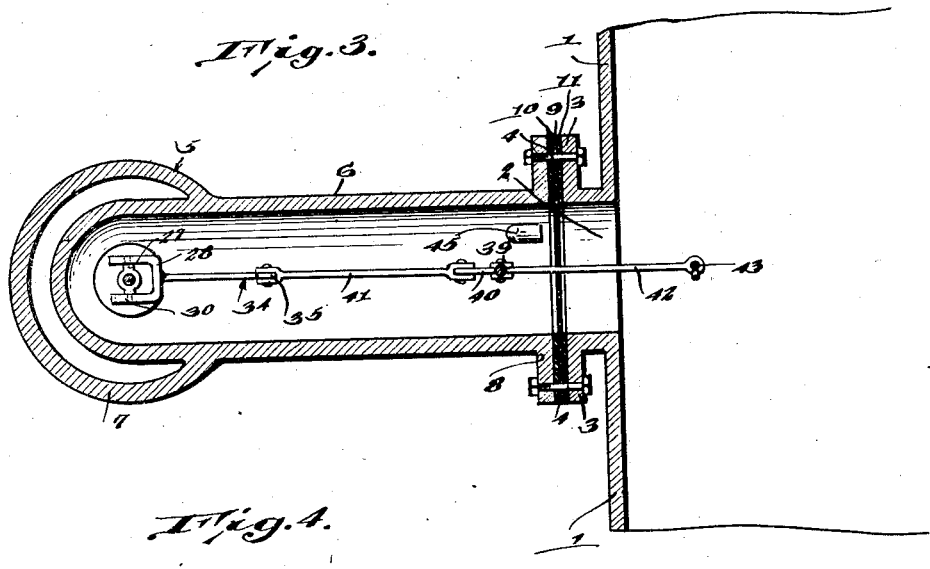
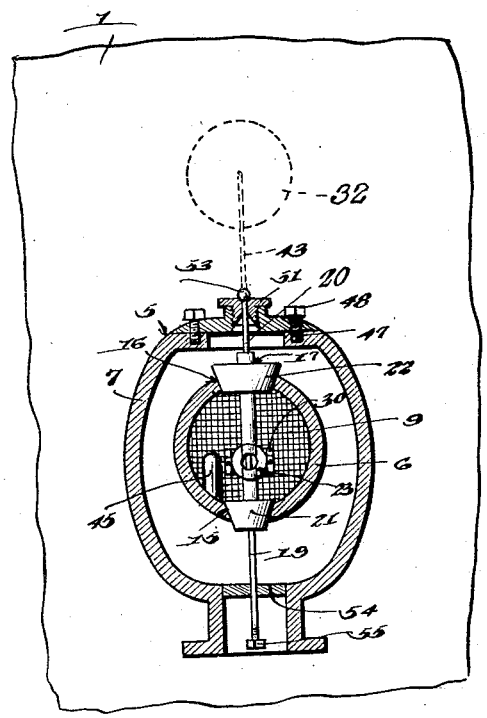
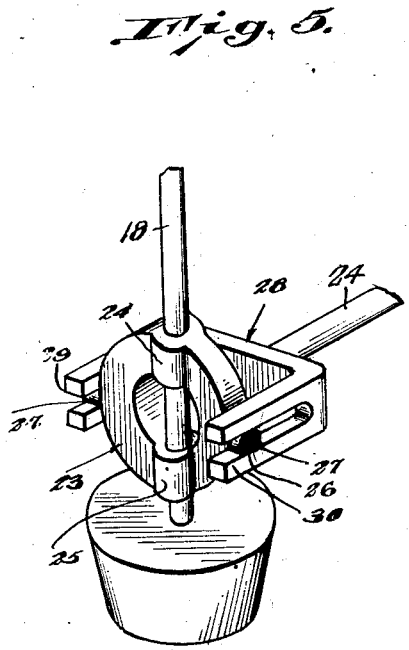
WITNESS
INVENTOR
A. D. Johnston,
BY
ATTORNEY Patented May 3, 1932

1,857,051

UNITED STATES PATENT OFFICE

ARTHUR D. JOHNSTON, OF PAMPA, TEXAS

MEANS FOR CONTROLLING THE LIQUID LEVEL IN CONTAINERS

Application filed July 19, 1930. Serial No. 469,221.

My invention relates to a means for controlling the liquid level in containers, more particularly to a means for controlling the liquid level in containers such as reservoirs, oil tanks, boiler water supply tanks and the like, and it consists in the constructions, combinations and arrangements herein shown and described.

An object of my invention is to provide a liquid level control means that will automatically release the liquid in a container such as a tank when the liquid in said container rises above a predetermined point.

A further object of my invention is to provide a device of the type described which will be entirely housed to exclude the same from access thereto to thus prevent disorder and disarrangement of the parts.

A still further object of my invention is to provide a device of the type described which will have its parts so protected from accumulations of sediment and other foreign matter in the liquid that the same will not be liable to disorder for this reason.

A still further object of the invention is to provide a device of the type described which has the parts so proportioned and arranged that wear on said parts is so evenly distributed and accommodated that the life thereof is greatly prolonged.

A still further object of my invention is to provide a device of the type described which has few parts, is simple to manufacture, easy to assemble and does not get out of order quickly.

Other objects and advantages will appear as the specification proceeds and the invention will be more particularly defined in the appended claims.

My invention is illustrated in the accompanying drawings forming a part of this specification, in which:

Figure 3 is a sectional view, on line 3—3 of Figure 2;

Figure 4 is a sectional view on line 4—4 of Figure 2;

Figure 5 is a perspective detail view of a portion of the device.

Figure 1:
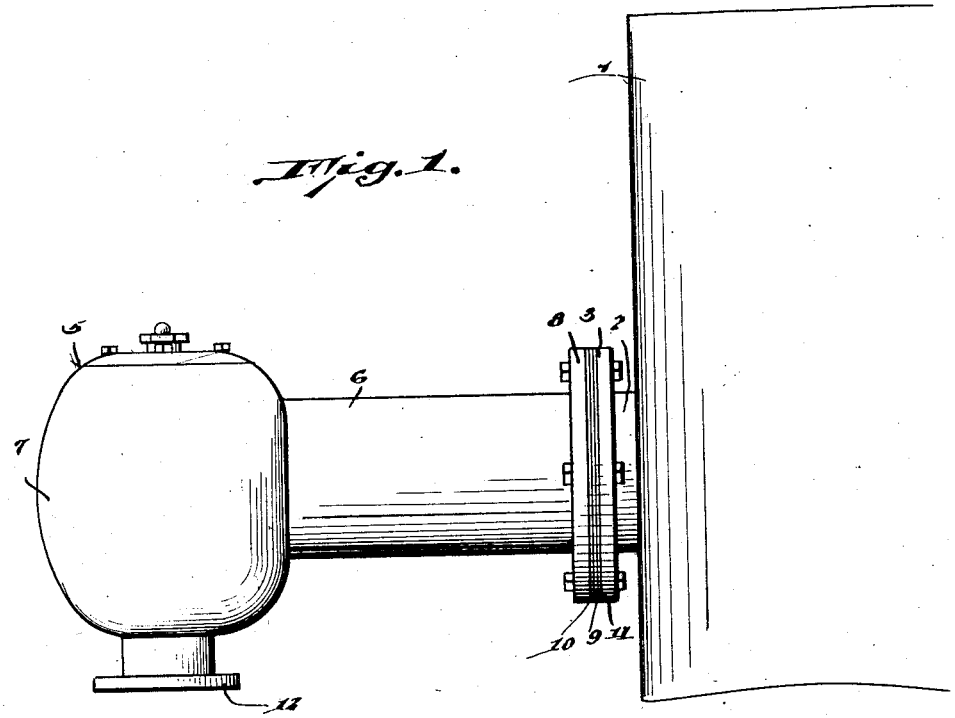
Figure 1 is an elevational view of a device in accordance with my invention.

In carrying out my invention I make use of a container 1 which may be an oil or water containing tank, a reservoir or any other liquid containing means.

My device is adapted to be mounted in position on any suitable outlet on the container such as the outlet shown at 2 on said container provided said outlet is positioned below the level at which it is wished to maintain said liquid.

In adapting this outlet to my invention I provide the same with a flange 3 having apertures therein for the reception of nut and bolt fasteners 4 therethrough. It is to this flange and by means of these fasteners that I secure my device in position.

For encasing the working parts of my invention as well as for providing a suitable conduit for the release of excess fluid from the outlet 2 I provide the housing 5 which has an elongated portion 6 and a chamber portion 7 for a purpose that will soon be evident. The elongated portion 6 is provided with an apertured flange 8 which may be identical in construction with the flange 3 of the outlet 2.

For preventing sediment and other foreign matter which may be in the container 1 from coming into contact with the working parts of my invention positioned in the casing 5, I place between said tank 1 and said casing 5 a screen 9 which is suitably apertured along its outer periphery in a manner similar to the flanges 3 and 8 for reception of the fasteners 4. This screen is further provided with a vertically positioned slot $9^a$ extending downwardly from the upper extremity thereof to a point in proximity to the lower extremity for reception of a movable member of the operating portions of my device as will soon be made clear.

For sealing the joint between the flanges 3 and 8 I position between said flanges and on either side of the screen 9 a pair of gaskets 10 and 11 which gaskets are of annular form and provided with apertures in the annulus for the reception of fasteners 4.

Figure 2:
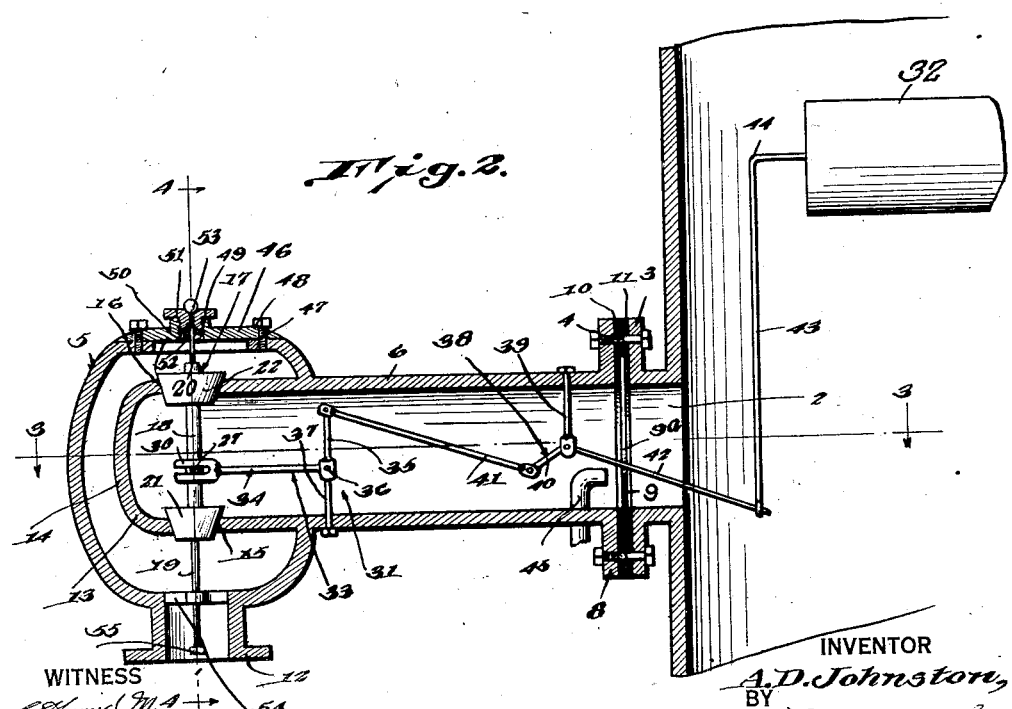
Figure 2 is a sectional view of my invention, with parts thereof shown in elevation for clearness of illustration.

It can easily be understood that when the fasteners are engaged with the various elements as shown in Figures 2 and 3 a tight joint will be secured with the screen and casing 5 firmly mounted in position relative to the tank and outlet.

The casing 5 has an outlet 12 in the base thereof for discharge of fluid therefrom. The portion 6 of this assembly penetrates into the chamber 5 a substantial distance as is most clearly indicated in Figure 2 at reference numeral 13. This portion 13 is provided with an end wall 14 which seals the portion 6 against flow of fluid therefrom. It is also provided with a pair of valve seats 15 and 16 in the lower and upper walls respectively thereof for cooperation with movable valves for controlling the flow of fluid from portion 6 as will soon be described. The valve seat 15 is of lesser cross sectional extent than valve seat 16 to permit easy assembly by allowing the use of a smaller valve for engagement with the seat 15 that is a valve of small enough size to pass entirely through valve seat 16.

For cooperation with said valve seats to perform the opening and closing operation of the valves a double valve member 17 is provided which double valve consists of an elongated rod 18 having guide rods 19 and 20 projecting from the lower and upper ends respectively thereof for engagement with guide bores in members that will soon be described. This valve rod is equipped with a valve member 21 for cooperation with the valve seat 15 and a valve member 22 for cooperation with the valve seat 16. It will be noted that these valve members are of truncated cone shape and that they cooperate with the valve seats 15 and 16 which are similarly shaped. It will also be observed that the valve member 21 is of lesser cross sectional area than valve member 22 and the smallest diameter of valve seat 16 to permit insertion of the valve member during assembly.

For attachment of the operating members of my device to this spindle 18 for operation of valve 17 I equip said spindle with an annular yoke member 23 which may be made integral with the member 18 or may be mounted rotatably but non-reciprocatively thereon. Ball bearings (not shown) may of course be provided between the bearing portions 24 and 25 of the annular yoke member 23 and the rod 18 for bringing about easy rotation thereof. The securing of the yoke 23 and its rod 19 against rotative reciprocating motion may be accomplished by an annular slot and tongue arrangement (not shown) between said members as is easily understood.

The annular yoke 23 is further equipped with a pair of projecting ears 26 which may be positioned on either side thereof at the approximate vertical center as shown most clearly in Figure 5. These ears are shown as being of circular construction and bearings 27 are mounted on said ears.

For engagement with the bearings 27 of the ears 26 to raise and lower the valve 17 for performing the opening and closing operation I provide a yoke 28 which yoke has on each arm thereof a slot 29 and a slot 30 to receive the bearings 27. These slots are of sufficient length to accommodate backward and forward motion of the ears 26 therein.

For raising and lowering the yoke 28 to consequently raise the valve 17 to open and shut the same, a system of levers generally indicated at 31, are provided, which levers are adapted for actuation by a float 32 which is maintained at the liquid level as is easily understood. This system of levers comprises a bell crank lever 33 having one arm thereof 34 connected to the yoke 28 and another arm thereof 35 projecting outwardly from the pivotal point 36 of the lever. This lever is mounted on a standard 37 which is secured in the lower wall of the portion 6 of the casing. Cooperating with this lever 33 is a rocker lever 38 which is mounted on a standard 39 in the upper wall of the portion 6 of the casing 5 and which is consequently oppositely disposed to the lever 33. The levers 33 and 38 are connected by their arms 35 and 40 by a connecting rod 41 swivelled thereto. The other arm 42 of the rocker lever 38 projects through the slot in the screen 9 and into the tank 1 for engagement with the float by means shown in Figure 2.

For connecting the float 32 to the lever 42 the connecting rod 43 is utilized. This connecting rod 43 is bent as indicated at 44 to conveniently connect the same to the float 32 and for easy connection of the arm 42 to lever 38. It is the length of this rod 43 that determines the level at which the liquid will be maintained in the container by my device.

For forcing sediment and other foreign matter from the screen 9 for preventing clogging of the apertures in said screen with a consequent disarrangement of the parts of my device, I provide a blow pipe 45 which is positioned on the inner side of the screen 9 and is adapted to project a stream of air from any suitable source (not shown) to blow the sediment from the screen back into the tank 1. This blow pipe is shown as positioned in the lower portion of my casing but it is easily understood that it may be positioned in any other wall thereof.

For preventing the loss of fluid from the chamber 5 during the operation of my device as well as for guiding the movable guide member 17 during the operation and for further permitting ease of assembly and disassembly of my device I provide the chamber 5 with a top cap 46 which top cap is secured in the opening 47 in the upper portion of the chamber by means of suitable fasteners such as screw bolts 48. This top cap is provided with a bore 49 for the reception of packing 50 and associated gland nut 51 above said packing which secures the packing in place. The gland nut 51 is provided with a bore 52 for the reception of the guide rod 20 of valve 18 for securing the same in straight line reciprocation. It will be noted that the guide portion 20 of the valve is equipped with a ball 53 which ball is utilized as an indicating means to an operator for showing when the valve is elevated or lowered to opened or closed positions respectively.

To guide the guide rod 19 in straight line reciprocation the outlet 12 is equipped with a bushing 54 mounted therein and having a bore for passage of the guide rod. This guide rod is equipped with a nut 55 which engages the bushing 54 to prevent overtravel of the valve member 17 and thus prevent possible breakage of the parts.

From the foregoing description, the use and operation of my device is easily understood. The flange on the outlet is formed as heretofore set forth. The flange of my casing member 5, the gaskets 10 and 11 and the screen 8 are then positioned as shown in Figure 2 and the fasteners 4 screwed into position as shown in said figure. The outlet 12 of my casing member 5 is then positioned over the container or in the place at which it is wished to deposit the excess fluid flowing from the tank 1. The device is thus set up for operation.

The rod 43 is then formed of a length suitable for positioning the float 32 at the level at which it is desired to maintain the liquid in the tank while at the same time connecting said float to the arm 42 of the rocker lever 38. Of course it is understood that the length of this rod 43 may be varied as desired to secure liquid levels at variable points. It must be made of suitable length to connect the float to the arm 42 of lever 38 when the parts are positioned in valve closed position, that is the position shown in Figure 2.

When the parts are thus positioned as shown in said figure and the water level rises to engage the float 32, the same will be elevated by said liquid carrying with it by means of arm 43, arm 42 of rocker lever 38. This movement will move the bell crank lever 33 clockwise, about its pivot 36 because of the connection of said lever to arm 40 of rocker lever 38. Movement of the bell crank lever about its pivot in a clockwise direction elevates arm 34 thereof with a consequent elevation of yoke 28, associated yoke 23 and movable valve rod 17. This operation raises the valve members 21 and 22 from their respective seats 15 and 16 to permit emission of the liquid from the portion 6 into chamber 7 and through outlet 12 about bushing 54 which is suitably cut away to permit this passage.

The up and down movements of arm 42 of rocker lever 38 are accommodated by means of the screen 9.

Upon the flow of liquid from the outlet 12 the liquid level in tank 1 will descend carrying with it float 32 and gradually closing the valve members 21 and 22 to cut off the flow of liquid until the float 32 reaches the predetermined point at which position the valves are closed and the tank 1 is adapted to maintain the liquid at the desired level.

During these movements the slotted relation of the yoke 28 to the ears 26 accommodates the arcuate movement of the yoke 28 about the pivot 36 as is easily understood.

When the operator desires to clean the screen 9 from the accumulation of sediment or other foreign matter on the outer face thereof he simply forces air through the blow pipe 45, to force said sediment or other foreign matter from said screen and back into the tank 1.

It is thus seen that I have provided a means for controlling the liquid level in containers that houses the parts from dirt and other foreign matter that would tend to disorder them and which prevents access of persons thereto who might disarrange the parts.

It is further seen that I have provided a device for controlling the liquid level in containers that will not become disordered due to accumulations of foreign matter such as sediment to the operating parts.

It may further be seen that I have provided a device for controlling the liquid level of liquid in containers that so takes up the shocks incident to operation, that the wear caused by said shocks is well distributed throughout with a consequent decrease in the liability of breakage.

I claim:

1. In a means for controlling the liquid level in containers, a valve adapted to release the excess liquid in the container, means for actuating said valve in accordance with the level of the liquid in said container, a screen to shield said valve and said controlling means from sediment or other foreign matter in the liquid and a blow pipe for removing sediment from said screen.

2. In a means for controlling the liquid level in containers, a casing adapted to be secured to an outlet of said container, a screen positioned between said outlet and said casing, said screen having a slot formed therein, a reciprocable valve carried by said casing, lever means within said casing for operating said valve to open and closed positions, one of said levers projecting through the slot of said screen, means for moving said last mentioned lever and a blow pipe mounted adjacent said screen for removing sediment therefrom.

3. In a means for controlling the liquid level in containers, a casing adapted to be secured to an outlet of said container, a screen positioned between said outlet and said casing, said screen having a slot formed therein, said casing having an elongated portion closed at one end and a chamber portion provided with an outlet, said closed elongated portion projecting into said chamber and having a valve for release of fluid, a pair of spaced pivot standards mounted in said elongated portion, bell crank levers mounted upon said standards, one arm of one of said bell cranks being connected to said valve, a rod connecting the other arm thereof with an arm of said other bell crank, the other arm of said last named bell crank projecting through the slot of said screen, and a float connected to said last named arm for actuation of said valve in accordance with the level of the liquid in said container.

4. In a means for controlling the liquid level in containers, a casing adapted to be secured to an outlet of said container, said casing having an elongated portion closed at one end and a chamber portion provided with an outlet, said closed elongated portion projecting into said chamber and having a pair of valve seats formed in the walls thereof, a double valve mounted within said elongated portion and cooperating with said seats, a pair of spaced pivot standards mounted in said elongated portion, bell crank levers mounted upon said standards, one of said bell cranks being connected to said valve, a float connected to said other bell crank lever and a rod connecting said bell cranks.

ARTHUR D. JOHNSTON.